Dec. 19, 1944.    M. L. SOLOMON    2,365,151
POWER APPARATUS FOR ALIGNING WORK
Filed Nov. 6, 1942

INVENTOR.
MILLIAGE L. SOLOMON,
BY Lyon&Lyon
ATTORNEYS

Patented Dec. 19, 1944

2,365,151

UNITED STATES PATENT OFFICE 2,365,151

POWER APPARATUS FOR ALIGNING WORK

Milliage L. Solomon, Los Angeles, Calif.

Application November 6, 1942, Serial No. 464,758

3 Claims. (Cl. 144—289)

This invention relates to a device to be used in building large structures of metal plates or shapes, and while it would be useful in many situations, it is expected to have its greatest utility in ship building.

In conducting ship building operations, there are many occasions in which a gang of helpers or workmen must exert considerable force to bring parts together that are to be connected, and which may involve operations such as drilling, welding, riveting, or any other work to be done.

One of the objects of this invention is to produce a power device that will be capable of being set up on or at the work, and operated so as to exert force to bring parts together or hold the same so as to facilitate building operations; also to provide such a device that will be the means of saving time and man power.

A further object is to provide a device of the general character suggested, that will include a power cylinder associated with a support and clamp in such a way that it can be applied in many situations to eliminate laborious operations now carried on largely by hand.

A further object is to provide a device or tool of this kind, capable of operating as a power clamp that can be readily mounted for operation at the scene of the work.

Further objects of the invention will appear hereinafter.

The invention consists in the novel parts and combination of parts to be described hereinafter, all of which contribute to produce an efficient power apparatus for aligning work.

A preferred embodiment of the invention is described in the following specification, while the broad scope of the invention is pointed out in the appended claims.

In practicing this invention, I provide a clamping jack or power jack including a fluid-operated cylinder with a piston or plunger extending therefrom, and provided with means enabling it to effect a working connection to the parts that are to be held or drawn together for any work that is to be performed.

Figure 3:
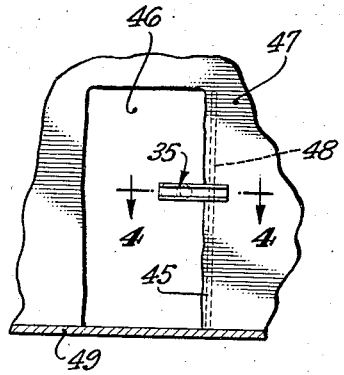
Fig. 3 is a front elevation of a bulk head plate or deck house wall at a door, and illustrating the same power jack shown in Fig. 1 but with its jaws reversed to enable it to be used for fairing up the rough edge of a doorway cut through the plating.
Figure 1:
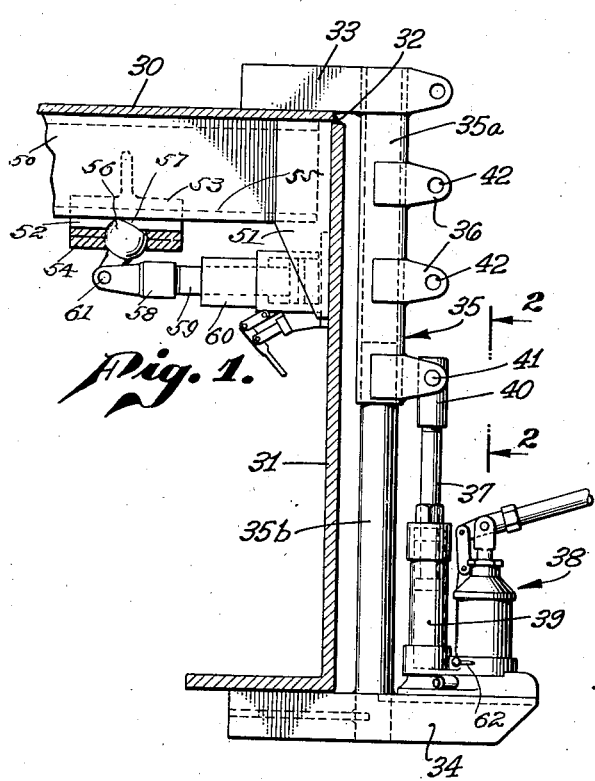
Fig. 1 is a vertical section with parts broken away, taken through a hatch coaming and illustrating power clamps of my invention and how the same can be employed to align the edge of a deck plate against the edge of the coaming to enable the same to be "tacked" down by a welder before the final welding operation is performed.
Figure 4:
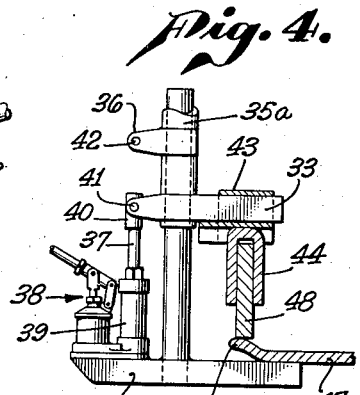
Fig. 4 is a horizontal section taken about on the line 4—4 of Fig. 3, but upon a larger scale and further illustrating how the clamp is used to facilitate this operation.
Figure 2:
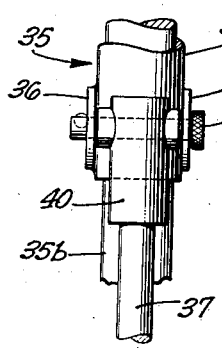
Fig. 2 is a detail showing the parts of a disconnectible joint in Fig. 1, projected on the plane of the line 2—2 of Fig. 1.

In Fig. 1 I illustrate an adaptation of my invention for the operation of aligning the edge of a deck plate 30 against the edge of a hatch coaming 31 to enable tack welding to be effected in the welding groove 32. In this case I provide two clamp jaws 33 and 34 connected by an extension bar 35 composed of two sections 35a and 35b guided on each other; or telescoping together as illustrated, in which case the tubular section 35a is preferably provided with a plurality of anchor means such as paired lugs 36 for disconnectible attachment to the end of the piston rod or plunger 37 of the jack 38. This plunger extends out from the power cylinder 39 and its outer end has a head 40 that fits in between the paired lugs and may be secured in there by a removable pin 41 that will fit into the aligned holes 42 of the lugs. The tubular section 35a is open at its upper end and this enables the sections 35a and 35b to be telescoped in a relation, reversed as indicated in Fig. 4. In this view and Fig. 3, the jaws 33 and 34 are nearer together with the sections 35a and 35b extending in the same direction from the jaws. In this case the jaw 33 carries a rider 43 that can slide onto it, and this rider has a saddle 44 that is useful for fairing up the rough and wavy edge 45 of a doorway 46 through the plates of a bulkhead 47 or a deck house wall. In performing this operation, I provide a door frame bar 48 that rests at its lower end on the deck 49. The saddle 44 is then applied to this frame bar with the jaw 34 on the other side of the plate 47, and when the power of the jack is applied the bar 48 bends the edge 45 into the plane of the plate. The bar 48 is then tack welded to the edge 45 in the vicinity of the saddle, and the saddle is then slid along to a new position on the bar.

It should be understood that the illustrations of the uses of my invention described above, are only several of the many uses to which it can be put in practice as a saver of time and man power.

If the coaming plate 31 shown in Fig. 1, is out of line with the edge of the deck plate 30, it may be necessary to use one of my jack-clamp combinations to effect its proper alignment. Suppose, for example, that the upper edge of the coaming 31 tends to hold itself too far back under the edge of plate 30 so as to occupy the clearance space between the coaming and the end of the deck beam 50 at its overlap on the gusset 51. In such a situation I employ a saddle plate or clamp 52 with an upper jaw 53 and a lower jaw 54. This saddle is applied over the edge of the corner flange 55 of the deck beam. The lower jaw carries a ball-form cam 56 with a flat or rounded upper face 57 and having a short arm below that attaches to a jack fitting 58 that screws onto the end of the plunger 59 of a jack 60. The foot of the jack 60 should be seated against the coaming 31, and when the jack is pumped up, its knuckle connection through pivot pin 61 will rock the ball cam 56 over and cause it to bite against the under side of the flange 55. This anchors the saddle 52 securely on the beam for taking the thrust of the jack. All the jacks used should be two-way jacks to enable them to be used for pulling as well as pushing. The other jack 38 illustrated in Fig. 1, is a two-way jack, being provided with a valve (not illustrated) in its base controlled by a handle 62. In one position of this valve, the jack can pump the operating liquid into one end of the cylinder 39, and in the other position can direct the liquid into the cylinder end above the piston which is shown in dotted lines.

The jack 60 and cam clamp 57 may be used in many situations on structural work not necessarily including a beam such as the deck beam 50, for it is obvious that the saddle 53 can be applied to the edge of a plate as well as to a flange of a beam. And as the cam 56 is of ball form, it can clamp against a flange or plate edge, with the jack leading off from it in any direction. This is a valuable feature of this jack.

Figure 5:
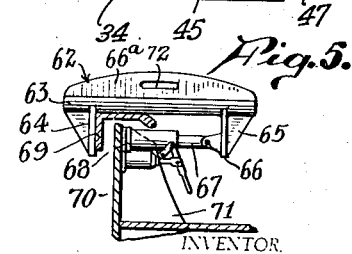
Fig. 5 is a vertical section illustrating how the jack apparatus of my invention may be used for pulling a horizontal rail and a vertical plate into abutment with each other, my apparatus being shown in side elevation.

The apparatus of my invention can be used in a situation where it is necessary to press a vertical plate and a horizontal rail into abutment with each other. This is illustrated in Fig. 5, in which 62 illustrates my jack apparatus which consists of a stout round bar, or pipe 63, having reinforced jaws 64 and 65 welded to the same on the under side. A strongback 66a is welded to the other side of this bar, and the inner face of the jaw 65 is provided with a joint connection including the pivot pin 66 for attaching the plunger 67 of a jack 68 to the same. This apparatus would be applied in position as illustrated, with the jaw 64 engaging one side of the horizontal rail 69 so that the bar 63 of the apparatus would lie on the upper face of the rail. The jack would then be swung up into a substantially horizontal position so that its face would thrust against the side of the vertical plate 70. A construction such as this often presents itself in ship construction, where a rail is to be forced into proper alignment at the bulwarks of the ship. In such a situation the vertical plate 70 would be welded to vertical knee plates, or bulwark plates, such as the plates 71.

The strongback 66a may be provided with a hand-hold 72 for convenience in carrying this jack apparatus about.

While I have described and illustrated a hydraulic jack in connection with my jack apparatus, it should be understood that in general, I do not limit myself to this particular type of jack, as it is obvious that mechanical jacks such as screw jacks, or gear jacks, could be employed if desired.

The pivot pin 66 should be disconnectible for convenience in disconnecting the jack from the strongback and body bar 63. This is advantageous in facilitating the portability of this jack apparatus without exceeding undue weight in each part that must be carried.

Many other embodiments of the invention may be resorted to without departing from the spirit of the invention.

What I claim is:

1. In a clamping jack, the combination of an extensible bar having two sections guided on each other, a jaw extending laterally from each of said bar sections, a fluid-operated cylinder mounted on one of said jaws, said cylinder having a piston with a rod extending therefrom and toward the other jaw, the bar section of said other jaw having a plurality of spaced anchoring means for the piston rod, and means to secure the piston rod to any one of said anchoring means.

2. In a clamping jack, the combination of an extension bar having two telescoping sections, a jaw carried by each of said sections, a jack cylinder associated with one of said jaws, and having a piston with a rod extending toward the other jaw, the bar section of the other jaw having a plurality of spaced anchor lugs, and disconnectible means for securing the piston rod to said anchor lugs.

3. A clamping jack constructed as described in claim 1, in which the bar section carrying the anchor lugs is of tubular form, open at both ends, thereby enabling the bar sections to be telescoped with the bar sections extending in the same direction from the jaws.

MILLIAGE L. SOLOMON.